United States Patent
Ho et al.

(10) Patent No.: US 7,433,750 B2
(45) Date of Patent: Oct. 7, 2008

(54) DATA TRACKING METHOD AND SYSTEM APPLIED IN SEMICONDUCTOR MANUFACTURING

(75) Inventors: Yu-Wen Ho, Hsinchu (TW); Tzu-Hsiu Liu, Hsinchu (TW)

(73) Assignee: Powerchip Semiconductor Corp., Hsin-Chu (TW)

( * ) Notice: Subject to any disclaimer, the term of this patent is extended or adjusted under 35 U.S.C. 154(b) by 0 days.

(21) Appl. No.: 11/642,683

(22) Filed: Dec. 21, 2006

(65) Prior Publication Data

US 2008/0014766 A1   Jan. 17, 2008

(30) Foreign Application Priority Data

Jun. 30, 2006   (TW)   ............................... 95123750 A

(51) Int. Cl.
*G06F 19/00* (2006.01)

(52) U.S. Cl. ................ 700/115; 700/103; 700/121; 705/8

(58) Field of Classification Search ........... 700/103, 700/108, 115, 121; 705/8
See application file for complete search history.

(56) References Cited

U.S. PATENT DOCUMENTS

| 5,889,674 | A  | * | 3/1999 | Burdick et al. | ............. | 700/121 |
| 6,615,096 | B1 | * | 9/2003 | Durrant et al. | ............. | 700/115 |
| 7,266,417 | B2 | * | 9/2007 | Liao | ......................... | 700/108 |

* cited by examiner

*Primary Examiner*—Albert Decady
*Assistant Examiner*—Douglas S Lee
(74) *Attorney, Agent, or Firm*—Muncy, Geissler, Olds, & Lowe PLLC

(57) ABSTRACT

A data tracking method applied in semiconductor manufacturing is provided. Split historical data of a wafer lot is retrieved and it is determined whether the end of lot data of the wafer lot is read. If not, a maximum split number required for a split processing applied to the wafer lot is determined. Next, a virtual sub split number required for the current process station is determined according to the maximum split number and a current split number. At least one virtual sub lot for the current process station is created according to the virtual sub split number. Process data of an original wafer lot corresponding to the virtual sub lot is copied to the virtual sub lot and virtual sub lots for the next process station is continuously created when creation is complete.

9 Claims, 2 Drawing Sheets

DATA TRACKING METHOD AND SYSTEM APPLIED IN SEMICONDUCTOR MANUFACTURING

BACKGROUND OF THE INVENTION

1. Field of the Invention

The invention relates to data tracking methods and systems applied in semiconductor manufacturing, and more particularly to split lot tracking methods and systems using data warehouses applied in semiconductor manufacturing.

2. Description of the Related Art

Wafer manufacturing in semiconductor comprises split lot processing for generating new wafer lots, merging lot processing for parent, child, or similar lots, reworking lot processing for reworking procedures, and similar.

With respect to split lot processing, split lot tracking is essential and significant for production management and process analysis in semiconductor fabrications. Currently, a historical lot table is created, in which lot numbers (Lot_ID) and process stations (Ope_No) serve as a primary key. In each wafer data, the lot number records sub lot numbers when a split operation is executed. Database designs of some process management systems utilize denormalization with lot numbers of the previous process station to implement tracking processing. Thousands of data, however, are generated at each process station such that a single data cannot record all the split lot numbers.

As shown in Attachment 1, a historical data lot table 100 displays lot numbers and process stations of currently processed wafer lots, defining a lot key number (Lot_Key_No) and a previous lot key number (PRE_Lot_Key_No). The previous lot key number is a backward pointer, pointing to the lot key number. When a sub lot query is required, a previous historical data lot table is looked up according to the lot key number pointed to by the previous lot key number.

Further, Attachment 2 shows a master lot table 210 and a slave lot table 220, displaying lot numbers and process stations of the currently processed wafer lots. A lot ID (Lot_ID) and a terminal lot ID (TERMINALLot_ID) are defined in slave lot table 220. The lot ID points to the terminal lot ID to represent sub lots, corresponding to the terminal lot ID, of current lots, corresponding to the lot ID. Similarly, when a sub lot query is required, a previous historical data lot table is looked up according to the lot ID and the terminal lot ID.

As described, complete split lot record queries in a database are implemented, lot numbers of the previous process station are recursively read until the original wafer data is located, such that nearly one thousand queries are required to obtain a split lot record. This method is time-consuming, complex, and slow, thus, in-line controls and analysis efficiency suffer.

Thus, a split lot tracking method and system using data warehouses capable of rapid and detailed queries of required production data applied in semiconductor manufacturing is desirable.

BRIEF SUMMARY OF THE INVENTION

Data tracking methods applied in semiconductor manufacturing are provided. An exemplary embodiment of a data tracking method comprises the following. Split historical data of a wafer lot is retrieved and it is determined whether the end of lot data of the wafer lot is read. If not, a maximum split number required for a split processing applied to the wafer lot is determined. Next, a virtual sub split number required for the current process station is determined according to the maximum split number and a current split number. At least one virtual sub lot for the current process station is created according to the virtual sub split number. Process data of an original wafer lot corresponding to the virtual sub lot is copied to the virtual sub lot and virtual sub lots for the next process station are continuously created when the creation is complete.

Data tracking systems employed in semiconductor manufacturing are provided. An exemplary embodiment of a data tracking system comprises a lot calculation unit and a virtual sub lot creation unit. The lot calculation unit retrieves split historic data of a wafer lot, determines whether the end of lot data of the wafer lot is read, if the end of lot data of the wafer lot has not been read, a maximum split number required for a split processing of the wafer lot is determined, and the virtual sub split number required for the current process station according to the maximum split number and a current split number is also determined. The virtual sub lot creation unit creates at least one virtual sub lot for the current process station according to a virtual sub split number required to be created and copies process data of an original wafer lot corresponding to the virtual sub lot.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
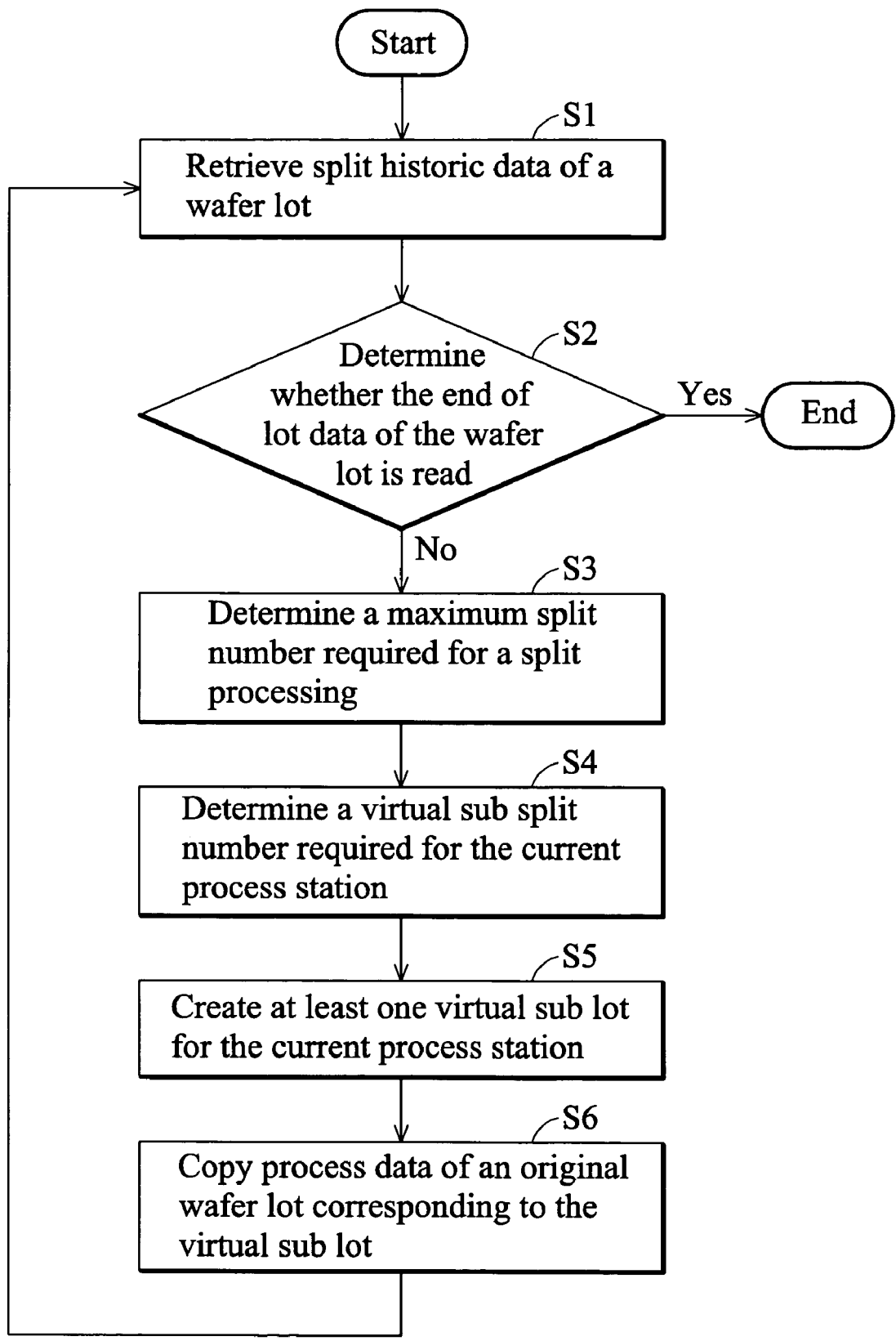
FIG. 1 is a flowchart of an embodiment of a data tracking method.

Several exemplary embodiments of the invention are described with reference to FIGS. 1 through 2, which generally relate to data tracking applied in semiconductor manufacturing. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a split lot tracking method and system using data warehouses applied in semiconductor manufacturing.

As shown in Attachment 3, a virtual reality (VR) historical lot table 320, excepting historical data lot table 310, (as shown by historical data lot table 100 in Attachment 1) is provided. Parameters of each table are described in the following.

Historical split lot data comprises sequentially split lot numbers (Cur_Lot_ID), previously split lot numbers (Prev_Lot_ID), and split time (Claim_Time) parameters.

Historical data lot table 310 records historical lot data (Lot_History) generated by each wafer lot processed at each process station. The historical lot data defines lot numbers (Lot_ID), process stations (Ope_No), move out time of each wafer lot (Move_Out_Time), and the amount of each move out wafer lot, and further comprises other related historical production data, such as process tools, wafer lots, employee codes, production parameters, and so forth.

VR historical lot table 320 defines lot numbers (Lot_ID), process stations (Ope_No), move out time of each wafer lot corresponding to the processed station (Move_Out_Time), original lot numbers corresponding to the processed station (Org_lot_ID), the amount of each move out wafer lot corresponding to the processed station (Move_Out_Wafer_Cnt), and further comprises related historical production data, such as process tools, wafer lots, employee codes, production parameters, and so forth.

Whenever a split process is executed, detailed process data of a sub lot at all process stations before the currently split process station is copied based on wafer data stored in VR historical lot table 320 is copied, with attaching the original lot numbers (Org_lot_ID). In practice, however, the sub lot has never been processed at those process stations.

Referring to Attachment 4, historical lot data stored in the triangle 410 indicates real historical lot data, generated by splitting and sequentially processing a wafer lot processed from the first station to the seventh station (step 1~step 7). Historical lot data stored in the triangle 420 indicates VR lot data generated based on the real historical lot data, in which an original lot code is attached to each VR lot data to show real lot number of a processed station. At the first process station (step 1), for example, the wafer lot A is practically processed such that sub lots A.1 and A.2 are VR sub lots and the amount of wafer lot of each VR sub lot is equal to lot A. The original lot code A is attached to the VR sub lots A.1 and A.2, respectively, indicating that lot A is actually processed rather than the lots A.1 and A.2. Additionally, at the third process station (step 3), lot A is split to generate sub lot A.1 that the sub lot A.2 is a VR sub lot of and the size of wafer lot A.2 is equal to sub lot A.1. The original lot code A.1 is attached to the VR sub lot A.2, indicating that lot A.1 is actually processed rather than the lot A.2. As described, complete historical lot data of each parent or child lot can be rapidly located.

Further, as described, in addition to the split processing, a merging processing may be required for a wafer lot, in which the generation process of each VR sub lot is similar to the described process.

FIG. 1 is a flowchart of an embodiment of a data tracking method.

Split historic data of a wafer lot is first retrieved (step S1) and it is determined whether the end of lot data of the wafer lot is read (step S2). If so, the process terminates. If not, a maximum split number required for a split processing applied to the wafer lot is determined (step S3). As shown in Attachment 4, for example, seven process recipes are implemented on a wafer lot at seven process stations, in which the maximum split number is 2, such that only one additional VR sub lot A.2 is required.

Next, a virtual sub split number required for the current process station is determined according to the maximum split number and a current split number (step S4). As shown in Attachment 4, for example, at the fourth station (step 4), the lot A has generated sub lot A.1, only one more VR sub lot is required. Next, at least one virtual sub lot for the current process station is created according to the virtual sub split number (step S5) and process data of an original wafer lot corresponding to the virtual sub lot is copied to the virtual sub lot (step S6). As shown in Attachment 4, for example, at the fourth station (step 4), if the wafer lot A comprises 25 pieces of wafer, 15 pieces are assigned to sub lot A.1 when a split operation is executed. Thus, the VR sub lot A.2 also comprises 15 pieces of wafer and process information equivalent to that of sub lot A.1. When the creation is complete, virtual sub lots for the next process station are continuously created.

Figure 2:
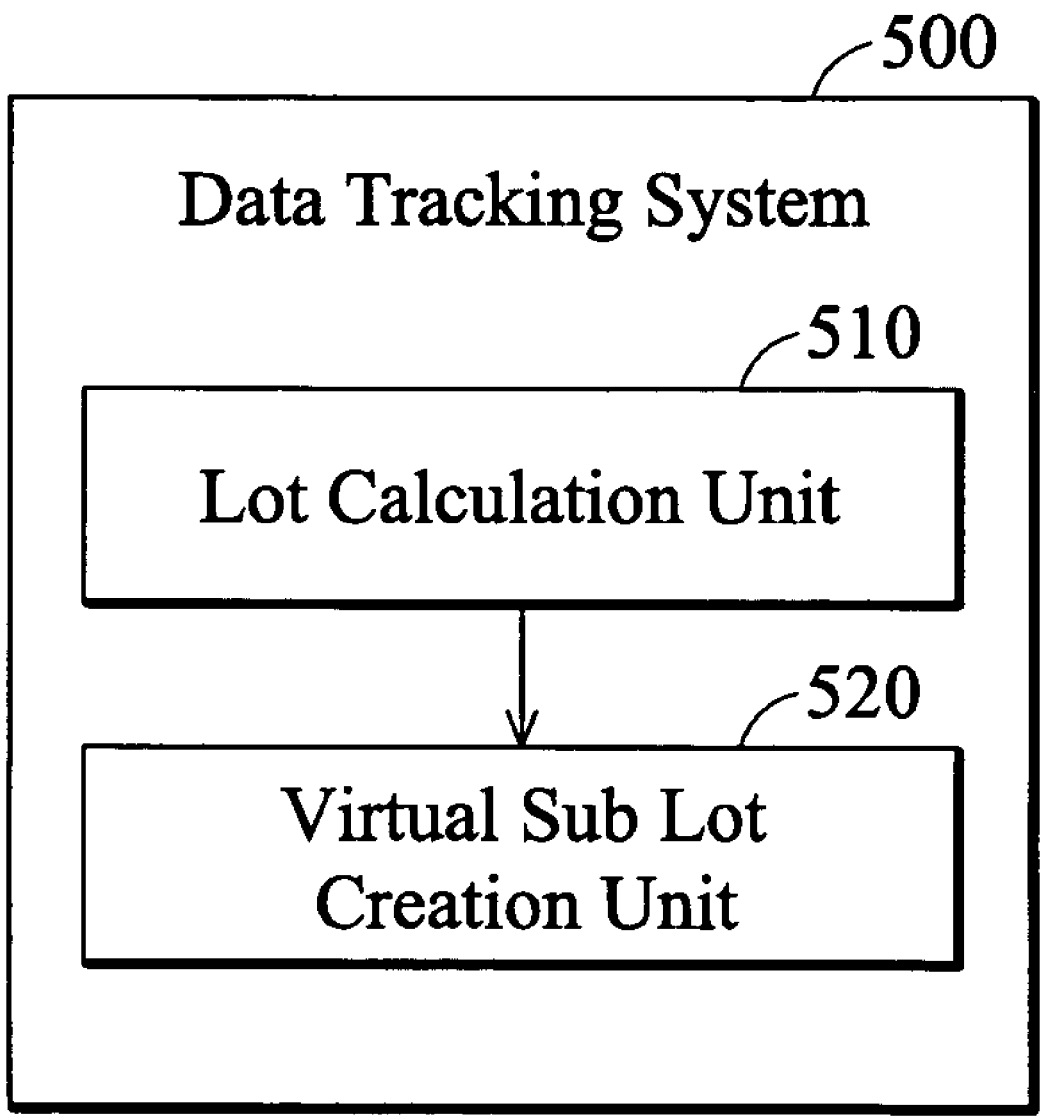
FIG. 2 is a schematic view of an embodiment of the architecture of a data tracking system.

FIG. 2 is a schematic view of an embodiment of the architecture of a data tracking system.

A data tracking system 500 comprises a lot calculation unit 510 and a virtual sub lot creation unit 520. Lot calculation unit 510 retrieves split historic data of a wafer lot, determines whether the end of lot data of the wafer lot is read, if the end of lot data of the wafer lot has not been read, determines a maximum split number required for a split processing applied to the wafer lot, and determines the virtual sub split number required for the current process station according to the maximum split number and a current split number. Virtual sub lot creation unit 520 creates at least one virtual sub lot for the current process station according to a virtual sub split number required to be created and copies process data of an original wafer lot corresponding to the virtual sub lot.

The data tracking method of the invention creates VR sub lots corresponding to a real wafer lot. A sub lot copies process information from an original wafer lot thereof to track and control lot data of each lot or sub lot in detail, thus further reducing query time.

Methods and systems of the present disclosure, or certain aspects or portions of embodiments thereof, may take the form of program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data tracking method, comprising:
   retrieving split historical data of a wafer lot;
   determining whether the end of lot data of the wafer lot is read;
   if not, creating at least one virtual sub lot for the current process station according to a virtual sub split number required to be created;
   copying process data of an original wafer lot corresponding to the virtual sub lot; and
   continuously creating virtual sub lots for the next process station when the creation is complete.

2. The data tracking method as claimed in claim 1, further comprising determining a maximum split number required for a split processing applied to the wafer lot if the end of lot data of the wafer lot has not been read.

3. The data tracking method as claimed in claim 2, further comprising determining the virtual sub split number required for the current process station according to the maximum split number and a current split number.

4. A data tracking system, comprising:
   a lot calculation unit, retrieving split historic data of a wafer lot and determining whether the end of lot data of the wafer lot is read; and
   a virtual sub lot creation unit, if the end of lot data of the wafer lot has not been read, creating at least one virtual sub lot for the current process station according to a virtual sub split number required to be created and copying process data of an original wafer lot corresponding to the virtual sub lot.

5. The data tracing system as claimed in claim 4, the lot calculation unit further determines a maximum split number required for a split processing applied to the wafer lot if the end of lot data of the wafer lot has not been read.

6. The data tracking system as claimed in claim 5, the lot calculation unit further determines the virtual sub split number required for the current process station according to the maximum split number and a current split number.

7. A computer-readable storage medium storing a computer program providing a data tracking method, comprising using a computer to perform the steps of:
   retrieving split historic data of a wafer lot;
   determining whether the end of lot data of the wafer lot is read;
   if not, creating at least one virtual sub lot for the current process station according to a virtual sub split number required to be created;
   copying process data of an original wafer lot corresponding to the virtual sub lot; and
   continuously creating virtual sub lots for the next process station when the creation is complete.

8. The computer-readable storage medium as claimed in claim 7, further comprising determining a maximum split number required for a split processing applied to the wafer lot if the end of lot data of the wafer lot has not been read.

9. The computer-readable storage medium as claimed in claim 8, further comprising determining the virtual sub split number required for the current process station according to the maximum split number and a current split number.

* * * * *